United States Patent
Watson et al.

(10) Patent No.: US 8,257,816 B2
(45) Date of Patent: Sep. 4, 2012

(54) SIGNAGE CONSTRUCTION METHOD AND APPARATUS

(75) Inventors: Virgil Allen Watson, Salem, IA (US); Jason Bender, Mt. Pleasant, IA (US)

(73) Assignee: Lomont Molding, Inc., Mt. Pleasant, IA (US)

( * ) Notice: Subject to any disclaimer, the term of this patent is extended or adjusted under 35 U.S.C. 154(b) by 1155 days.

(21) Appl. No.: 10/589,012

(22) PCT Filed: Feb. 4, 2005

(86) PCT No.: PCT/US2005/003553
§ 371 (c)(1), (2), (4) Date: Apr. 26, 2007

(87) PCT Pub. No.: WO2005/076920
PCT Pub. Date: Aug. 25, 2005

(65) Prior Publication Data
US 2007/0278355 A1    Dec. 6, 2007

Related U.S. Application Data

(60) Provisional application No. 60/541,975, filed on Feb. 5, 2004.

(51) Int. Cl.
*G09F 7/00* (2006.01)
*G09F 7/18* (2006.01)
(52) U.S. Cl. .......................... 428/99; 40/616; 40/607.13
(58) Field of Classification Search ............... 425/126.1; 428/99; 40/607.13, 616
See application file for complete search history.

(56) References Cited

U.S. PATENT DOCUMENTS

| 4,137,657 | A | * | 2/1979 | Wardle | 40/1.5 |
| 4,397,625 | A | * | 8/1983 | Hellmer et al. | 425/135 |
| 4,541,190 | A | * | 9/1985 | Weiner et al. | 40/610 |
| 4,865,793 | A | * | 9/1989 | Suzuki et al. | 264/278 |
| 4,880,368 | A | * | 11/1989 | Hasl et al. | 425/116 |
| 5,520,876 | A | * | 5/1996 | Dobler | 264/511 |

(Continued)

FOREIGN PATENT DOCUMENTS

BE    629355    1/1963

(Continued)

OTHER PUBLICATIONS

Source IML; The Directory of In-Mold Labeling; "In-Mold Labeling: Frequently Asked Questions"; Jan. 26, 2004; pp. 1-3; ABS Technologies, Inc.

(Continued)

*Primary Examiner* — Richard Crispino
*Assistant Examiner* — Robert Dye
(74) *Attorney, Agent, or Firm* — Zarley Law Firm, P.L.C.

(57) ABSTRACT

A sign (20) for viewing by persons in a traffic area accessible by the random passage of persons through the area, the sign (20) including a label (22) formed of a thin layer of plastic material upon which the subject matter of the desired sign is printed. A planar substrate (24) of molded material is fused to the label (22). The planar substrate (24) includes a mounting feature (26) adapted to secure the sign (20) to a second object. During manufacture, an injection device (46) and ejector system (50) are associated with a first sign mold portion, a label is placed in a second sign mold portion, the first and second sign mold portions are closed together during injection, and the previously formed sign is removed from the first sign mold portion via the ejector system (50) prior to closing the mold portions together.

4 Claims, 8 Drawing Sheets

U.S. PATENT DOCUMENTS

| | | | |
|---|---|---|---|
| 5,800,757 A * | 9/1998 | Abrams et al. | 264/132 |
| 5,922,367 A | 7/1999 | Assalita et al. | |
| 6,131,320 A * | 10/2000 | Eberle et al. | 40/610 |
| 6,416,706 B1 | 7/2002 | Fisher et al. | |
| 2001/0039750 A1 | 11/2001 | Venegas, Jr. | |
| 2003/0154639 A1 * | 8/2003 | Bowers et al. | 40/611.1 |

FOREIGN PATENT DOCUMENTS

| | | |
|---|---|---|
| CA | 2 216 867 C | 8/1997 |
| CA | 2 418 159 A1 | 1/2002 |
| CA | 2418159 A1 | 1/2002 |
| EP | 0439304 A1 | 7/1991 |
| EP | 0575224 A1 | 12/1993 |
| GB | 2299967 A | 10/1996 |
| WO | 0160579 A1 | 8/2001 |
| WO | WO 03/016017 * | 2/2003 |

OTHER PUBLICATIONS

Pye, R. G. W.; Injection Mould Design; 1983; pp. 129-131.

* cited by examiner

SIGNAGE CONSTRUCTION METHOD AND APPARATUS

CROSS REFERENCE TO RELATED APPLICATIONS

This application claims the benefit of U.S. Provisional Application No. 60/541,975, filed Feb. 5, 2004.

BACKGROUND OF THE INVENTION

This invention is directed toward an apparatus and method for constructing signage.

Signs are used to convey information and are in wide spread use to provide warning, information, traffic control, advertisement, etc. Signs used indoors can be subjected to wear, vandalism, etc. Signs used outdoors are subjected to the destructive forces of ultraviolet light, corrosives, wind and thermal variation. The environment in which the sign will be used dictates the required construction technique.

Current sign construction techniques include printing directly on a semi-rigid substrate of plastic. Signs are also printed directly on a rigid substrate of wood, aluminum or steel. Printing directly onto a rigid (or semi-rigid) substrate limits the quality of graphics on the resultant sign, and it is typically more difficult and costly to print directly onto a rigid substrate than to print to a flexible substrate (such as vinyl).

To avoid these problems, many current sign construction techniques alternatively include printing on a flexible substrate label and applying this label directly to rigid substrate such as walls, posts, wood, aluminum, steel, or semi-rigid substrate of plastic, etc. Affixing is commonly done with a pressure sensitive adhesive layer applied to the reverse side of the flexible label. While this two step process of printing to a flexible substrate label and applying this label to a rigid substrate is less costly than the direct printing method, this two step process results in signs that are less durable.

Additionally, prior art standard injection molding configurations and procedures, shown in FIG. 5, have a single station injection molding machine 10 injecting plastic through a stationary platen 12 and into the "A" half of the mold through a sprue bushing 14. All cores needed to create holes in the sign, and all molded features needed for mounting and orientation would be incorporated into the "B" side of the mold. Upon mold opening, the finished part would normally stick to and travel with B side. Necessarily, to remove the finished part from the B side, an ejector system 16 is incorporated under the B side of the mold. In this configuration, and to make signs, the label would have to be placed on the A side of the mold prior to injecting plastic resulting in the requirement to have a hole in the center of the label to allow the molten plastic to pass through to the mold cavity, or alternately, incorporate a runner system that routes plastic around to one or more sides of the cavity. Alternatively, the label would be placed on the B side of the mold requiring removal of the part by a robot prior to placing the label. This requires two trips by the robot for each sign produced increasing production time. Further, in this configuration, and to make signs, the label could be placed on the B side of the mold but would require that the robot remove the finished part, deposit it on a conveyor, pick up the next label in sequence and place it in the B side. This arrangement requires that the robot make two trips into the mold at each opening thereby doubling the time required to manufacture signs.

In view of these problems, it is an object of this disclosure to provide signage for viewing by persons in a traffic area having a planar substrate of molded material fused to a label.

A further object of this disclosure is to provide a sign having a planar substrate of molded material fused to a label, the planar substrate including a mounting feature adapted to secure the sign to a second object.

Another object of this disclosure is to provide a method of sign manufacturing having an injection device and ejector system associated with a first sign mold portion and a label placed in a second sign mold portion.

A still further object of this disclosure is to provide a guidance system incorporated into the mold and label hopper to accurately and repetitively position labels in the mold.

These and other objects will be apparent to those skilled in the art.

BRIEF SUMMARY OF THE INVENTION

A sign for viewing by persons in a traffic area accessible by the random passage of persons through the area, the sign including a label formed of a thin layer of plastic material upon which the subject matter of the desired sign is printed. A planar substrate of molded material is fused to the label. The planar substrate includes a mounting feature adapted to secure the sign to a second object. During manufacture, an injection device and ejector system are associated with a first sign mold portion, a label is placed in a second sign mold portion, the first and second sign mold portions are closed together during injection, and the previously formed sign is removed from the first sign mold portion via the ejector system prior to closing the mold portions together.

DETAILED DESCRIPTION OF THE PREFERRED EMBODIMENT

Figure 1:
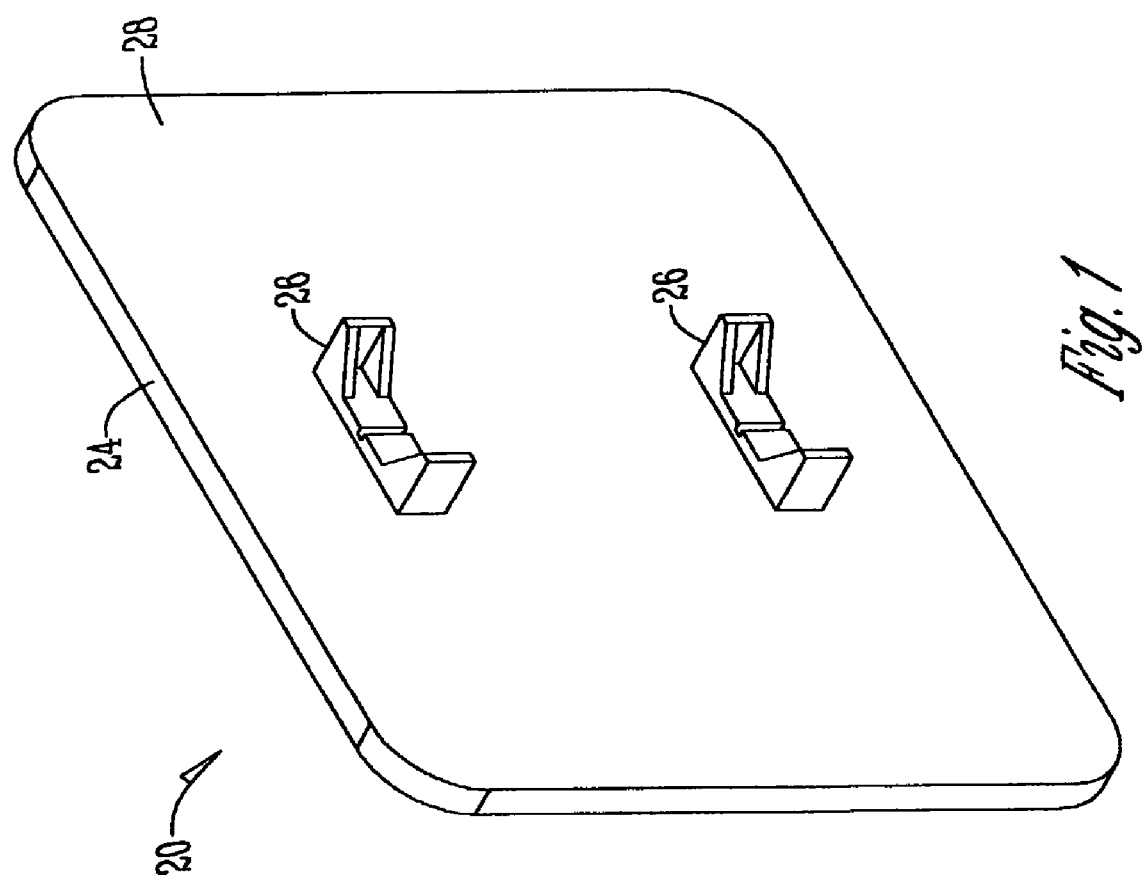
FIG. 1 is a rear perspective view of a sign according to the present invention.

This invention relates to a construction method that cost effectively and easily addresses the previously mentioned shortcomings of the prior art. In general, the method involves preprinting a sign on a flexible thermoplastic substrate or label, placing the label in a molding machine and injecting hot thermoplastic to fill the mold. The preprinted label is formed of thermoplastic that is chosen to be compatible with the injected thermoplastic, and the label thermally and permanently fuses to the injected plastic. This process is commonly referred to as In Mold Labeling or In Line Graphics. The present invention thermally and permanently fuses the label and planar substrate of injected thermoplastic to form new and useful sign arrangements via new and useful methods of construction of signs.

The thermoplastic material of either the label and/or the planar substrate may be selected based on the particular environmental end-use requirements of the particular application. As examples, cold weather flexibility could be enhanced by use of PPO for either the label and/or the planar substrate, and environments requiring impact resistance could be satisfied with polycarbonate for either the label and/or the planar substrate. Polyethylene could be used in highly corrosive environments for either the label and/or the planar substrate, and Nylon could be used in high abrasion applications for either the label and/or the planar substrate. Other types of thermoplastic material for either the label and/or the planar substrate may be selected based on the particular environmental end-use requirements of the particular application. Resistance to ultraviolet light is enhanced by selection of thermoplastic material, label material and ink.

The label may be printed by various methods selected based on the particular graphical requirements of the particular application. Low quality graphical requirements for the label can be printed with flexography and high quality graphics for the label could be printed with lithography or gravure. Digital graphics such as ink jet and laser can be used for the label used on short run or personalized signs. Product cost is directly affected by selection of printing process. Printing equipment in wide spread use require that the label be thin and flexible (e.g. paper, films, foils) in either sheet feed or web form. Standard printing equipment will not print directly on rigid labels such as wood, steel or aluminum. Further, abrasion resistance of the sign of the present invention is improved by printing the graphics on the reverse side of the label thereby exposing only the outer surface of the label to the environment.

The thickness of the planar substrate of the sign may be selected based on the requirements of the particular application. For example, the thickness of the planar substrate of the sign may be selected based on the environmental end-use requirements for rigidity or strength. In embodiments where semi-rigid signs would be desired, a relatively thin planar substrate, on the order of 0.080 thick could be provided. In embodiments where rigid signs would be desired, relatively thick planar substrate, on the order of 0.1875" to 0.250" thick could be provided. The thickness of the planar substrate of the sign would be controlled by mold cavity depth. For example, the molded signs of the present invention can be manufactured with similar performance specifications to aluminum or steel signs with a substantial reduction in cost and weight.

Figure 3:
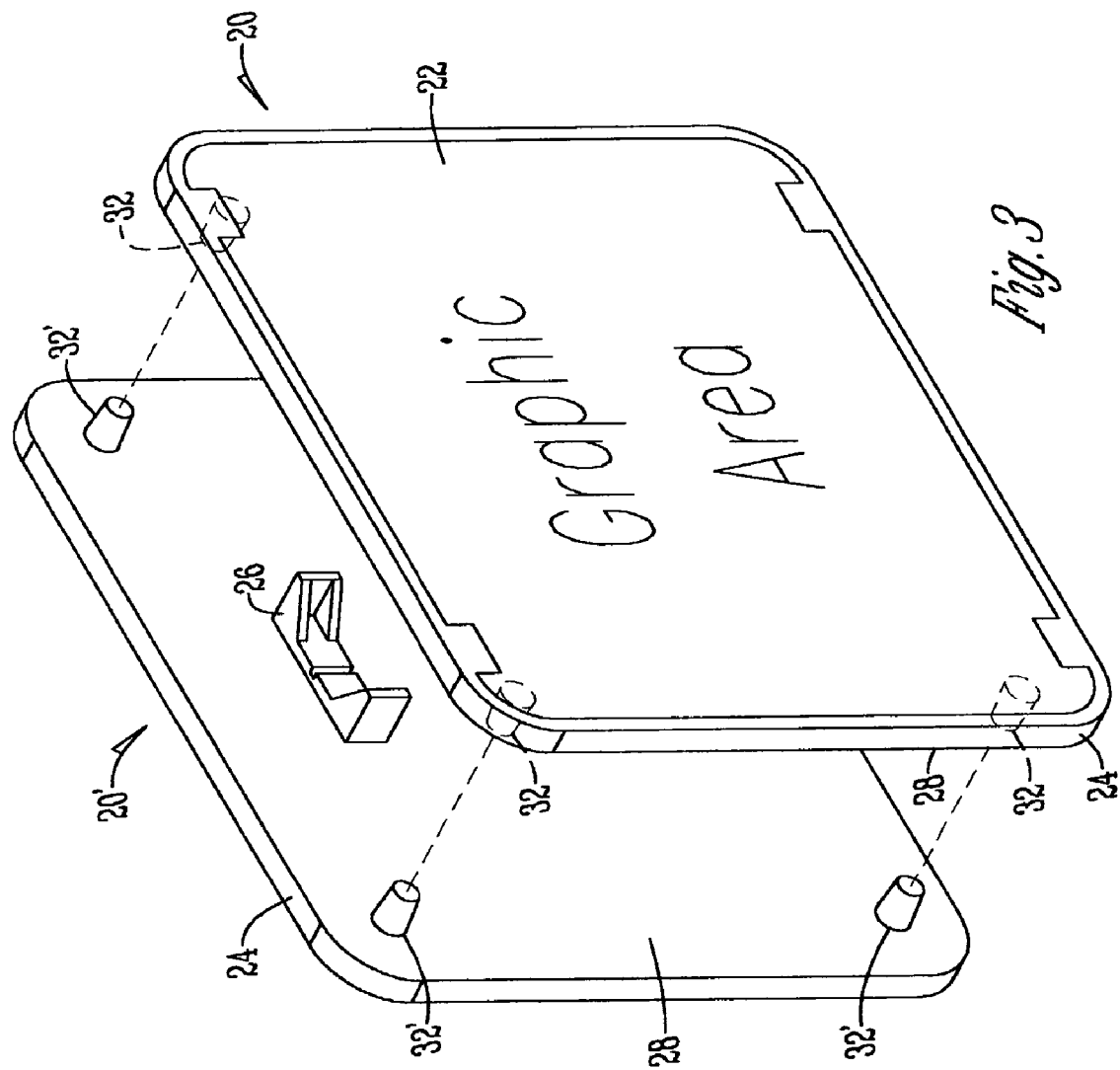
FIG. 3 is a front perspective view of a sign according to the present invention.

Referring to FIGS. 1 and 3, a sign 20 includes a label 22. The label 22 is formed of a thin layer of plastic material upon which the subject matter of the desired sign 20 is printed. A planar substrate 24 of molded material fused to the label 22.

Sign mounting and orientation features can be easily and cost effectively incorporated into the mold. The planar substrate includes a mounting feature 26 adapted to secure the sign 20 to a second object, such as a post for example. The mounting feature 26 is located on a back side 28 of the sign located opposite from the label 22. The molded plastic mounting feature 26 has a cross section to complement the cross sections of mounting posts or stakes (not shown).

Additionally, mounting holes and point-of-purchase display holes (not shown) can be incorporated by installing core pins in the mold. These holes eliminate the requirement for manufacturers or end-users to drill or punch holes.

Figure 2:
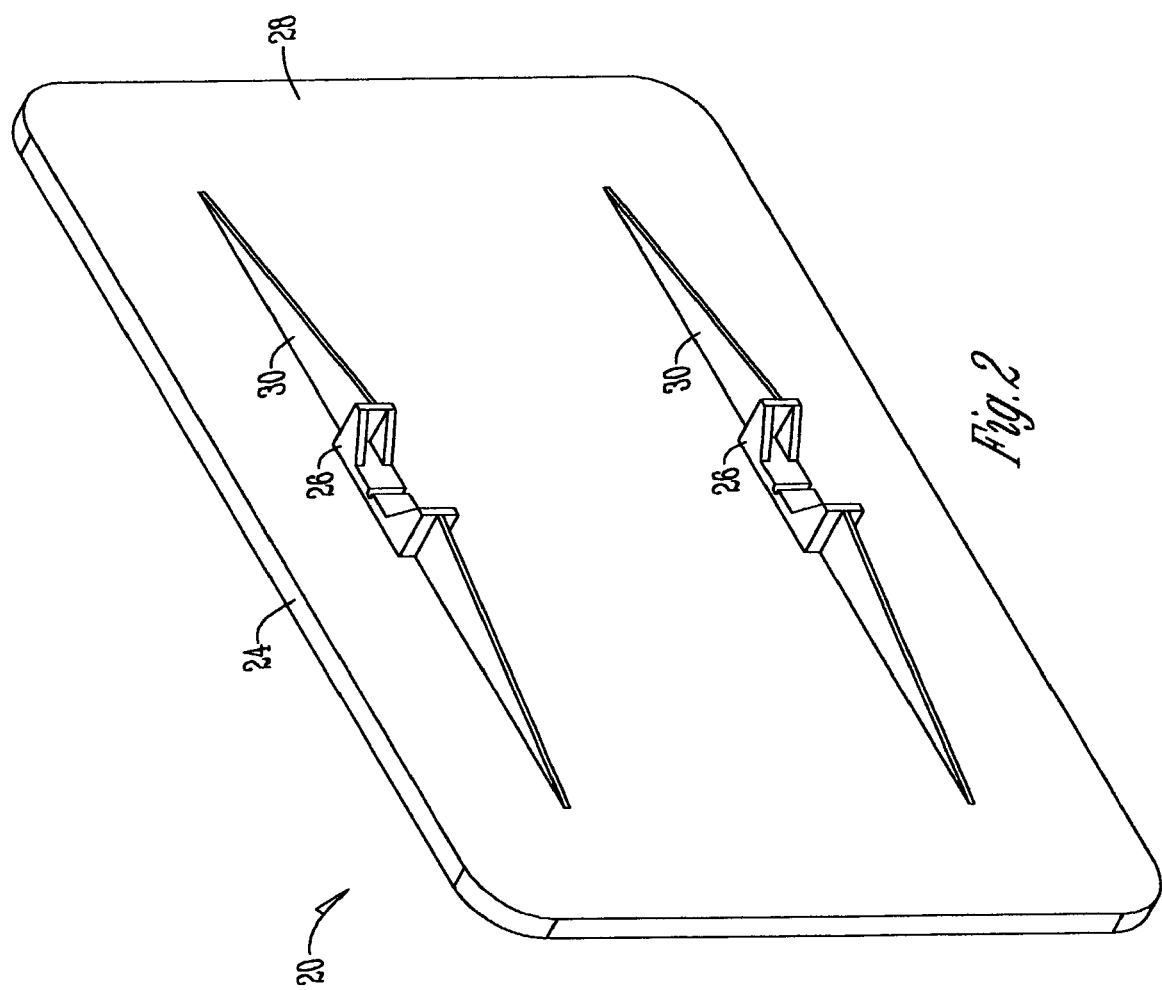
FIG. 2 is a rear perspective view of a sign according to the present invention.

Referring to FIG. 2, the planar substrate further includes a stiffening rib 30 located on a back side 28 of the sign 20 located opposite from the label 22. The stiffening rib 30 strengthens the planar substrate 24 to resist deformation. Features such as the stiffening rib 30 designed to increase sign 20 strength and rigidity can be included in the mold.

Referring to FIG. 3, the mounting feature 26 may also be a mated fastener 32 adapted to mount the sign 20 to a second sign 20' having a corresponding mated fastener 32' located thereon. The mated fastener 32 is located on a back side 28 of the sign 20 located opposite from the label 22. The mated fastener 32 on the first sign 20 secures the first sign 20 to a mated fastener 32' on the back side 28 of the second sign 20'. The mated fastener 32 may be a male snap element adapted to mate with a corresponding female snap element mated fastener 32' on the second sign 20', or any other suitable fastening device. Features designed to assemble two signs 20 and 20' together back to back can be incorporated into the mold.

Figure 4:
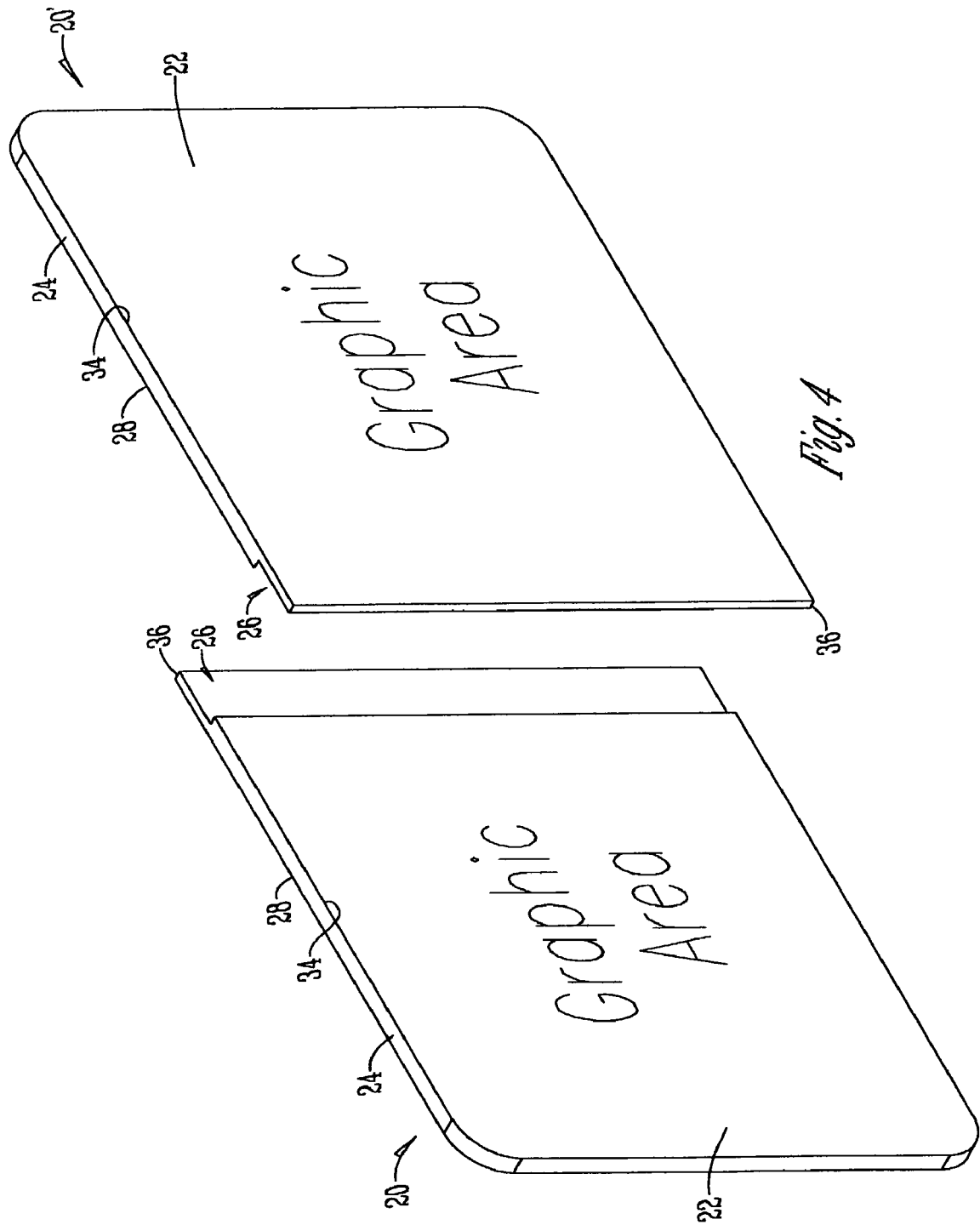
FIG. 4 is a front perspective view of a sign according to the present invention.
Figure 5:
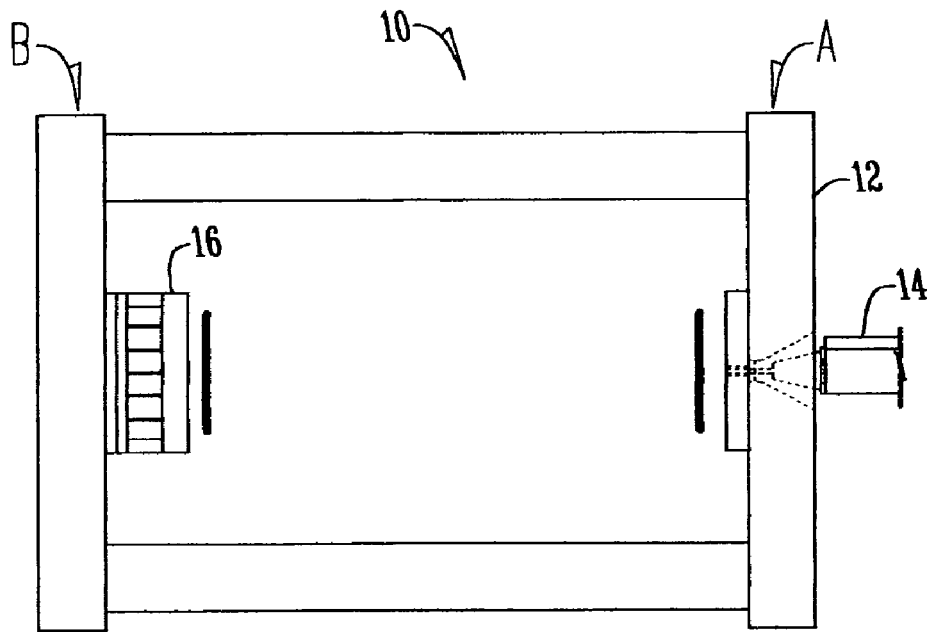
FIG. 5 is a top view of a prior art molding machine.

Referring to FIG. 4, the first sign 20 and second sign 20' each have the label 20 located on a front side 34 thereof. Ends 36 extend between the front side 34 and back side 28 of the first sign 20 and second sign 20', respectively. The ends 34 include a mounting feature 26 adapted to secure the end 34 of the first sign 20 to the end 34 of the second sign 20' so that the labels 22 of the first and second signs 20 and 20' are contiguous. The mounting feature 26 on the first sign 20 may be a groove adapted to mate with a corresponding groove on the second sign 20', or any other suitable mounting feature. Features designed to allow signs to be assembled end to end can be incorporated into the mold.

Figure 6:
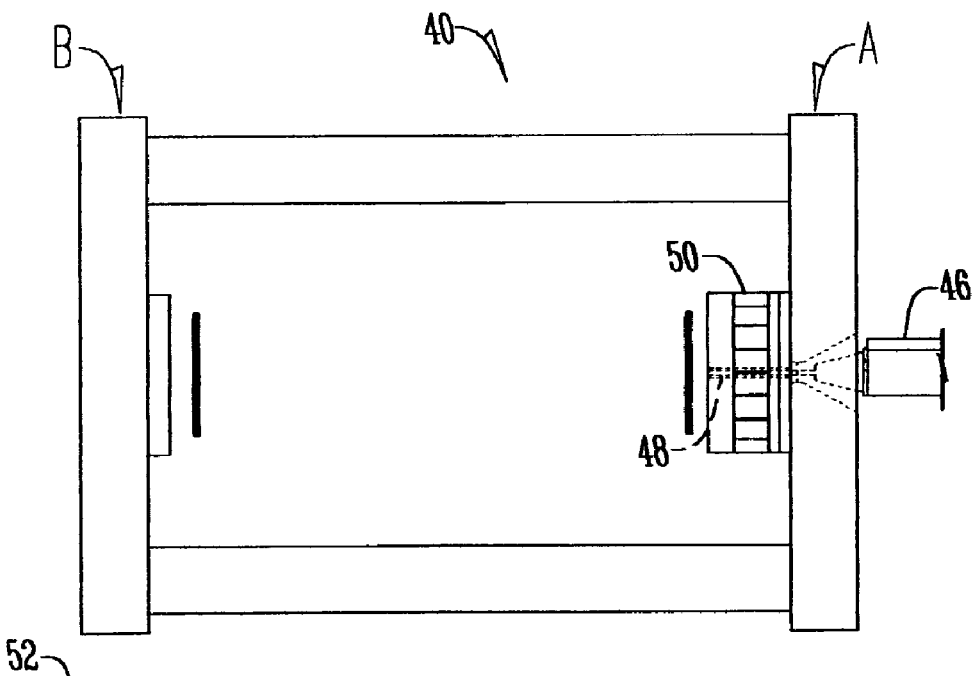
FIG. 6 is a top view of a prior art molding machine according to the present invention.
Figure 7:
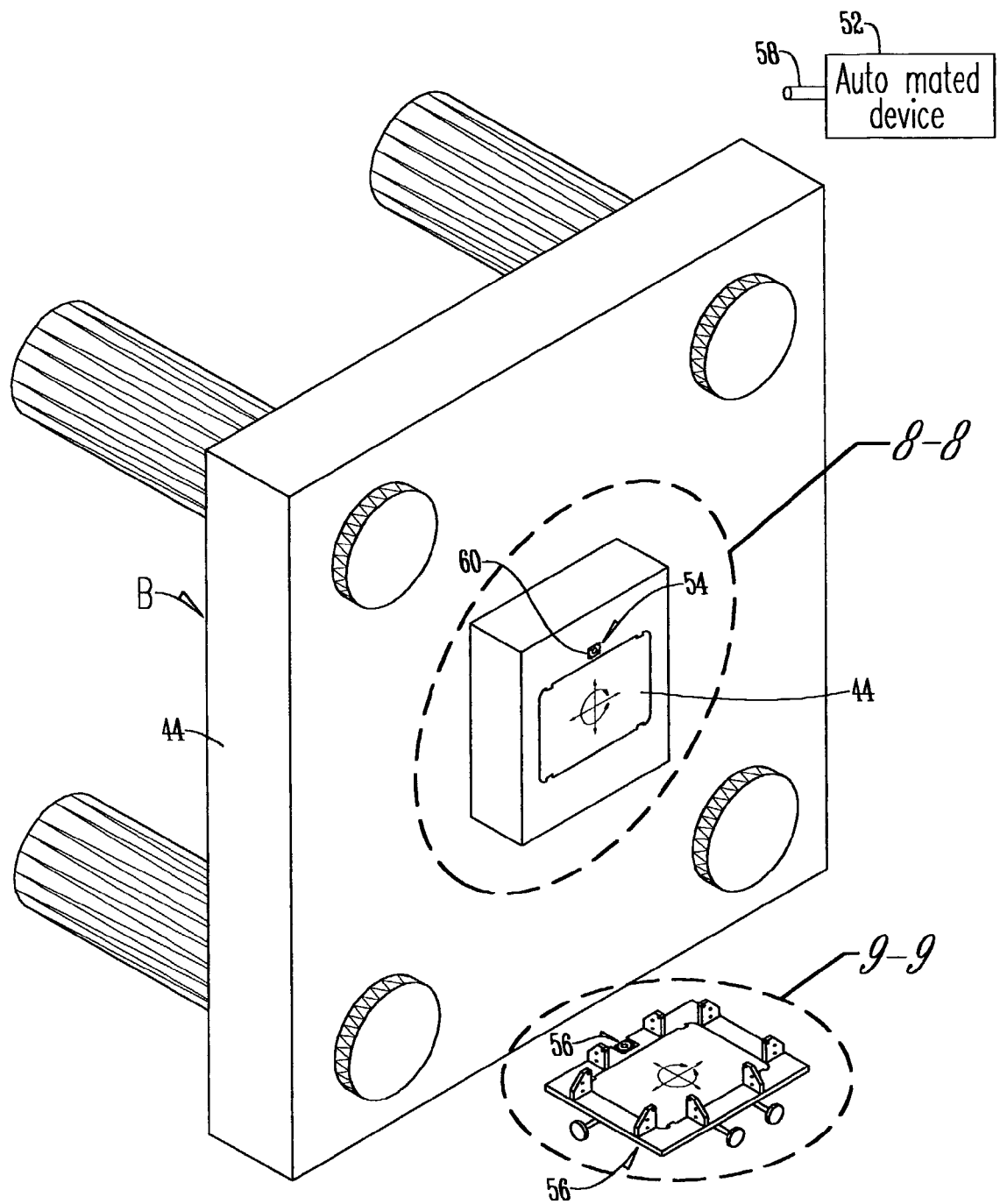
FIG. 7 is a front perspective view of a sign mold and label hopper according to the present invention.

With reference to FIGS. 6 and 7, a molding machine 40 includes first and second sign mold portions A and B located opposite from one another. The second sign mold portion B has a planar area 42 substantially equal to the size of the sign desired, the planar area 42 located on a platen 44. The label, such as a thin layer of plastic material is placed in the planar area 42 of the second sign mold portion B. The subject matter of the desired sign is printed upon label.

An injection device 46 is associated with the first sign mold portion A. No running system is required for the injection device 46, as the injection device 46 injects directly into the first sign mold portion A. The injection device 46 injects through a heated sprue bushing 48. The heated sprue bushing 48 can be operated to eliminate the need to later manually trim the sign. The injection device 46 may include either high or low pressure injection molding equipment.

An ejector system 50 is associated with the first sign mold portion A. The ejector system 50 contacts a formed sign on a side opposite from the label, eliminating damage to the label side of the sign from the ejector system 50. For example, pins operated with hydraulic cylinders (not shown) of the ejector system 50 are located on the back of the sign. This eliminates marking on the label side of the sign that normally occurs with ejection of the sign.

A previously formed sign is removed from the first sign mold portion A via the ejector system 50 prior to closing the mold portions together. The steps of placing the label and removing the previously formed sign may be performed simultaneously. Additionally, the steps of placing the label and removing the previously formed sign may be performed by an automated device 52. For example, the automated device 52 may be a three axis robot with specialized end of arm tooling. Where the steps of placing the label and removing the previously formed sign are performed simultaneously, the automated device 52 may enter between the first and second sign mold portions A and B a single time to perform both steps. Thus, the placement of a label on the B side of the molding machine 40 and removal of the finished sign from the A side of the molding machine 40 requires only one entrance into the molding machine 40 by the automated device 52.

Figure 8:
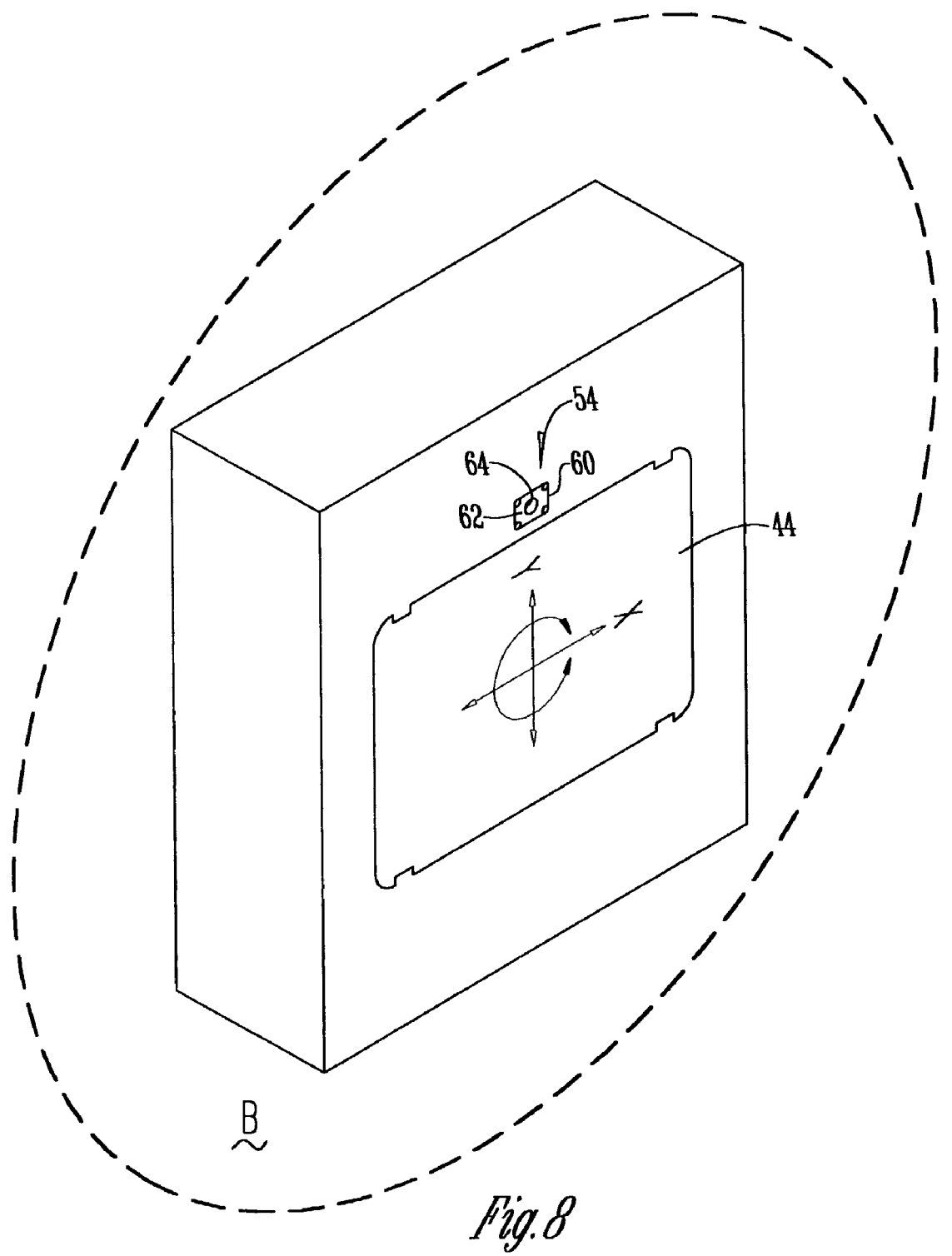
FIG. 8 is a front perspective view of the sign mold taken along line 8-8 of FIG. 7, according to the present invention.
Figure 9:
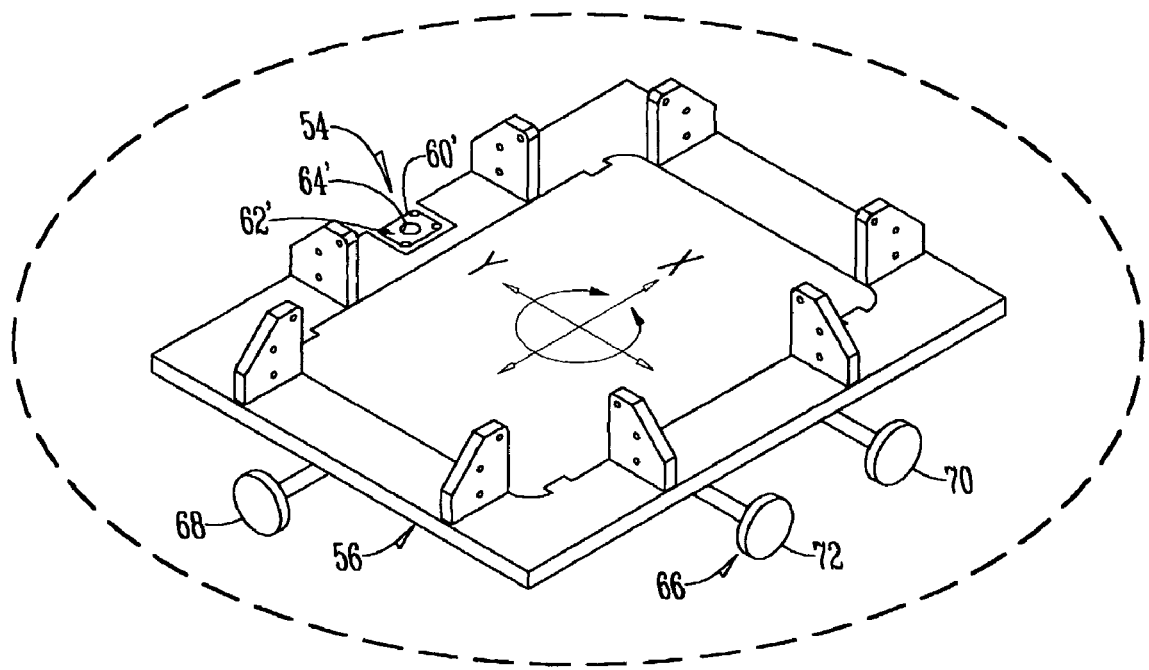
FIG. 9 is a front perspective view of the label hopper taken along line 9-9 of FIG. 7, according to the present invention.

With reference to FIGS. 7-9, the present invention includes a guidance system 54 for accurate placement of the label in the molding machine 40. The guidance system 54 incorporated into the second sign mold portion B and label hopper 56 accurately and repetitively positions labels in the second sign mold portion B. The automated device 52 includes a guidance portion 58 adapted to mate with a corresponding guidance member 60 located on the second sign mold portion B to properly align the label with the second sign mold portion B. The guidance member 60 is located in a non-part position in the second sign mold portion B covered with a thin plate 62 with close tolerance guidance hole 64. This thin plate guidance hole 64 is engaged by the guidance portion 58 of the automated device 52, such as for example a locating pin or stud mounted on an end of arm tooling.

The automated device 52 acquires a label from the label hopper 56. The guidance portion 58 of the automated device 52 mates with a corresponding second guidance member 60' located on the label hoper 56 to properly align the label with the automated device 52. The second guidance member 60' includes a secondary thin plate 62' with a guidance hole 64' incorporated into the label hopper 56 in the same relative position to the label as is in the second sign mold portion B. During pick up and placement of the label, the guidance portion 58 of the automated device 52 engages the thin plate guidance hole 64' and deflects or guides the guidance portion 58 of the automated device 52 to the same relative position repeatedly. The guidance members 60 and 60' accurately positions the guidance portion 58 of the automated device 52 in the lateral and vertical position, as well as minimizing depth alignment issues that are very difficult to achieve in normal production conditions.

The orientation of the label is adjusted with respect to the second sign mold portion B via an orientation adjustment mechanism 66 located on the label hopper 56. The orientation adjustment mechanism 66 permits adjustment of label position and skew in the second sign mold portion B placement position by adjusting the skew and pick up position of the label in the label hopper 56. The orientation adjustment mechanism 66 is adapted to adjust the orientation of the label with respect to the second sign mold portion B in a lateral direction, vertical direction, and rotational direction. For example, the orientation adjustment mechanism 66 includes a lateral adjuster 68 adapted to modify the lateral position of the label, a vertical adjuster 70 adapted to modify the vertical position of the label, and a rotational adjuster 72 adapted to modify the rotational position of the label.

In embodiments where multiple labels are to be incorporated into a single sign, a first set of labels having a first graphic and a second set of labels having a second graphic are provided. At least one label from the first set of labels and at least one label from the second set of labels are placed in the second sign mold portion B to form the sign with multiple labels. For example, groups or sets of signs of various numbers and graphics may be produced where a sign set includes three of one graphic and four of another graphic. In this instance, the labels can be pre-collated into the required number and type prior to being placed in the label hopper 56. This would substantially reduce the cost of pick and pack order fulfillment.

With reference back to FIGS. 6 and 7, in operation the first and second sign mold portions A and B are closed together after the label is placed in the second sign mold portion B. A quantity of heated molding material is then injected into the first sign mold portion A via the injection device 46 and over the label to cast a planar sign having the size and shape of the mold. The temperature of the molding material is maintained at a sufficient temperature to cause the molding material to fuse to the label. The molding material is allowed to harden. The sign composed of the hardened molded material with the label fused thereto is removed from the first sign mold portion A via the ejector system 50. The sign may then be erected in a traffic area.

Whereas the invention has been shown and described in connection with the embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A sign for viewing by persons in a traffic area accessible by the random passage of persons through the area, comprising:
    a label formed of a flexible thermoplastic substrate upon which the subject matter of the desired sign is printed;
    a planar substrate of injected thermoplastic molded material fused to the label; and
    wherein the planar substrate includes a mounting feature adapted to secure the sign to a second object;
    wherein the second object is a second sign and wherein the mounting feature secures the first sign to a back side of the second sign located opposite from the label;
    wherein each sign has a front side including the label, a back side located opposite from the front side, and an end extending between the front side and back side, the mounting feature is located on the end of the first sign, and wherein the mounting feature secures the first sign to the end of the second sign so that the labels of the first and second signs are contiguous.

2. The sign of claim 1, wherein the planar substrate further includes a stiffening rib located on a back side of the sign located opposite from the label, the stiffening rib strengthening the planar substrate to resist deformation.

3. The sign of claim 1, wherein the mounting feature is a male snap element adapted to mate with a corresponding female snap element on the second sign.

4. The sign of claim 1, wherein the mounting feature is a groove adapted to mate with a corresponding groove on the second sign.

* * * * *